(12) United States Patent
Zhao et al.

(10) Patent No.: US 12,350,921 B2
(45) Date of Patent: Jul. 8, 2025

(54) SELF-ADHESIVE WATERPROOF COILED MATERIAL OF SUPER-STRONG CROSS LAMINATED FILM AND PREPARATION PROCESS

(71) Applicant: TIANJIN JOABOA TECHNOLOGY CO., LTD., Tianjin (CN)

(72) Inventors: Dongqi Zhao, Tianjin (CN); Jingfeng Song, Tianjin (CN); Qingyu Li, Tianjin (CN); Cheng Zhang, Tianjin (CN); Xian Cao, Tianjin (CN); Tao Lu, Tianjin (CN)

(73) Assignee: TIANJIN JOABOA TECHNOLOGY CO., LTD., Tianjin (CN)

( * ) Notice: Subject to any disclaimer, the term of this patent is extended or adjusted under 35 U.S.C. 154(b) by 203 days.

(21) Appl. No.: 17/918,855

(22) PCT Filed: Jul. 27, 2021

(86) PCT No.: PCT/CN2021/108630
§ 371 (c)(1),
(2) Date: Oct. 13, 2022

(87) PCT Pub. No.: WO2022/022500
PCT Pub. Date: Feb. 3, 2022

(65) Prior Publication Data
US 2023/0234336 A1 Jul. 27, 2023

(30) Foreign Application Priority Data
Jul. 28, 2020 (CN) .......................... 202010735197.9

(51) Int. Cl.
*B32B 3/02* (2006.01)
*B32B 5/16* (2006.01)
(Continued)

(52) U.S. Cl.
CPC ................ *B32B 7/035* (2019.01); *B32B 3/02* (2013.01); *B32B 5/16* (2013.01); *B32B 7/12* (2013.01);
(Continued)

(58) Field of Classification Search
None
See application file for complete search history.

(56) References Cited

U.S. PATENT DOCUMENTS 2,326,724 A * 8/1943 Fasold ...................... E04D 5/10
428/920
3,937,640 A * 2/1976 Tajima ...................... E04D 5/10
156/278
(Continued)

FOREIGN PATENT DOCUMENTS

CA 1008738 A * 4/1977
CN 201730117 U * 2/2011
(Continued)

OTHER PUBLICATIONS

Machine Translation of CN-108394158-A, Aug. 2018 (Year: 2018).*
(Continued)

*Primary Examiner* — Jeffrey A Vonch
(74) *Attorney, Agent, or Firm* — Michael Best & Friedrich LLP

(57) ABSTRACT

The present invention relates to a self-adhesive waterproof coiled material of a super-strong cross laminated film, comprising sequentially from top to bottom: an isolation protection layer, a non-asphalt-based self-adhesive layer, a strong cross laminated film, an asphalt self-adhesive layer and a PE isolation film. One side of the upper surface of the coiled material is provided with an overlap edge, and the other side of the lower surface of the coiled material is also provided with an overlap edge. The waterproof coiled mate-
(Continued)

rial provided in the present invention has better adhesive property with post-cast concrete than an asphalt-based coiled material, and can be better bonded to a main body structure (i.e., pre-paving anti-sticking coiled material); the strong cross laminated film in the middle of the coiled material has good ductility, so that when the base layer slightly subsides or the main body structure is slightly deformed, the coiled material can continue to be well bonded to the main body structure and would not be separated; and a good waterproof effect thus can be achieved.

6 Claims, 1 Drawing Sheet

(51) Int. Cl.
| | |
|---|---|
| B32B 7/035 | (2019.01) |
| B32B 7/12 | (2006.01) |
| B32B 11/04 | (2006.01) |
| B32B 13/02 | (2006.01) |
| B32B 13/12 | (2006.01) |
| B32B 25/04 | (2006.01) |
| B32B 25/08 | (2006.01) |
| B32B 25/14 | (2006.01) |
| B32B 25/16 | (2006.01) |
| B32B 27/06 | (2006.01) |
| B32B 27/08 | (2006.01) |
| B32B 27/32 | (2006.01) |
| C08J 5/18 | (2006.01) |
| C09J 7/24 | (2018.01) |
| C09J 7/29 | (2018.01) |
| C09J 11/06 | (2006.01) |
| C09J 11/08 | (2006.01) |
| C09J 153/02 | (2006.01) |
| C09J 195/00 | (2006.01) |
| E04D 5/10 | (2006.01) |
| E04D 5/12 | (2006.01) |
| B32B 3/06 | (2006.01) |
| C08K 3/34 | (2006.01) |
| C08L 53/02 | (2006.01) |
| C08L 95/00 | (2006.01) |
| C09J 7/38 | (2018.01) |
| C09J 7/40 | (2018.01) |
| D06N 5/00 | (2006.01) |
| E04D 5/14 | (2006.01) |

(52) U.S. Cl.
CPC .......... *B32B 11/044* (2013.01); *B32B 11/046* (2013.01); *B32B 13/02* (2013.01); *B32B 13/12* (2013.01); *B32B 25/047* (2013.01); *B32B 25/08* (2013.01); *B32B 25/14* (2013.01); *B32B 25/16* (2013.01); *B32B 27/06* (2013.01); *B32B 27/08* (2013.01); *B32B 27/32* (2013.01); *C08J 5/18* (2013.01); *C09J 7/243* (2018.01); *C09J 7/29* (2018.01); *C09J 11/06* (2013.01); *C09J 11/08* (2013.01); *C09J 153/02* (2013.01); *C09J 153/025* (2013.01); *C09J 195/00* (2013.01); *E04D 5/10* (2013.01); *E04D 5/12* (2013.01); *B32B 3/06* (2013.01); *B32B 2250/242* (2013.01); *B32B 2255/10* (2013.01); *B32B 2255/20* (2013.01); *B32B 2255/26* (2013.01); *B32B 2264/10* (2013.01); *B32B 2264/303* (2020.08); *B32B 2264/4021* (2020.08); *B32B 2307/306* (2013.01); *B32B 2307/54* (2013.01); *B32B 2307/558* (2013.01); *B32B 2307/5825* (2013.01); *B32B 2307/7242* (2013.01); *B32B 2307/7265* (2013.01); *B32B 2307/7376* (2023.05); *B32B 2307/748* (2013.01); *B32B 2318/02* (2013.01); *B32B 2323/04* (2013.01); *B32B 2323/043* (2013.01); *B32B 2395/00* (2013.01); *B32B 2419/00* (2013.01); *B32B 2419/06* (2013.01); *C08J 2395/00* (2013.01); *C08J 2409/06* (2013.01); *C08J 2453/02* (2013.01); *C08J 2491/00* (2013.01); *C08K 3/34* (2013.01); *C08L 53/02* (2013.01); *C08L 53/025* (2013.01); *C08L 95/00* (2013.01); *C08L 2205/02* (2013.01); *C08L 2205/035* (2013.01); *C08L 2555/40* (2013.01); *C08L 2555/72* (2013.01); *C08L 2555/74* (2013.01); *C08L 2555/84* (2013.01); *C08L 2666/66* (2013.01); *C08L 2666/78* (2013.01); *C09J 7/38* (2018.01); *C09J 7/405* (2018.01); *C09J 2301/1242* (2020.08); *C09J 2301/162* (2020.08); *C09J 2301/408* (2020.08); *C09J 2423/046* (2013.01); *D06N 5/003* (2013.01); *D06N 5/006* (2013.01); *D06N 2203/08* (2013.01); *E04D 5/142* (2013.01); *E04D 5/148* (2013.01); *Y10S 428/906* (2013.01); *Y10T 428/141* (2015.01); *Y10T 428/1452* (2015.01); *Y10T 428/1471* (2015.01); *Y10T 428/1481* (2015.01); *Y10T 428/24058* (2015.01); *Y10T 428/2443* (2015.01); *Y10T 428/2817* (2015.01); *Y10T 428/2826* (2015.01); *Y10T 428/2852* (2015.01); *Y10T 428/2878* (2015.01); *Y10T 428/2883* (2015.01); *Y10T 428/31815* (2015.04); *Y10T 428/31917* (2015.04)

(56) References Cited

U.S. PATENT DOCUMENTS

| | | | | |
|---|---|---|---|---|
| 4,039,706 | A * | 8/1977 | Tajima | E04D 5/10 428/184 |
| 4,091,135 | A * | 5/1978 | Tajima | E04D 5/10 428/150 |
| 4,107,375 | A * | 8/1978 | Iwasaki | D06N 5/00 427/442 |
| 4,248,926 | A * | 2/1981 | Tajima | B32B 7/12 442/151 |
| 4,735,838 | A * | 4/1988 | Roberts | B32B 25/14 524/68 |
| 4,911,975 | A * | 3/1990 | Schult | D06N 5/00 428/167 |
| 5,316,848 | A * | 5/1994 | Bartlett | C09J 7/21 428/351 |
| 5,380,552 | A * | 1/1995 | George | E04D 7/005 428/150 |
| 5,496,615 | A * | 3/1996 | Bartlett | E01D 19/083 428/354 |
| 5,824,401 | A * | 10/1998 | Jenkins | B32B 27/08 428/476.3 |
| 6,134,856 | A * | 10/2000 | Khan | D06N 5/00 428/152 |
| 6,360,506 | B1 * | 3/2002 | Graae | E04D 5/12 52/552 |
| 6,385,934 | B1 * | 5/2002 | Zickell | E04D 5/12 52/409 |
| 7,125,601 | B1 * | 10/2006 | Pinault | E04D 5/12 428/141 |
| 2002/0048651 | A1 * | 4/2002 | Bindschedler | E04D 5/10 427/284 |
| 2003/0176574 | A1 * | 9/2003 | St. Clair | C08F 287/00 525/88 |
| 2003/0219563 | A1 * | 11/2003 | Zanchetta | E04D 5/02 428/40.1 |

(56) References Cited

U.S. PATENT DOCUMENTS

| | | | |
|---|---|---|---|
| 2003/0219564 A1* | 11/2003 | Hubbard | E04D 11/02 428/40.1 |
| 2004/0014385 A1* | 1/2004 | Greaves, Jr. | E04D 5/12 442/364 |
| 2004/0109985 A1* | 6/2004 | Furst | B32B 11/04 428/494 |
| 2005/0053745 A1* | 3/2005 | Bartek | B32B 11/00 428/41.5 |
| 2005/0252137 A1* | 11/2005 | Bartek | B32B 11/00 52/518 |
| 2006/0005496 A1* | 1/2006 | Pressutti | E04D 5/10 52/518 |
| 2006/0059825 A1* | 3/2006 | Wiercinski | C09J 7/38 52/506.01 |
| 2007/0218268 A1* | 9/2007 | Bindschedler | B32B 11/02 428/292.1 |
| 2008/0289289 A1* | 11/2008 | Wiercinski | B32B 27/12 52/745.06 |
| 2009/0277126 A1* | 11/2009 | Wollert | B32B 5/022 52/741.1 |
| 2010/0196648 A1* | 8/2010 | Samanta | B32B 7/06 428/351 |
| 2013/0065020 A1* | 3/2013 | Loftus | E04D 5/12 428/143 |
| 2013/0160674 A1* | 6/2013 | Hong | D06N 5/003 106/269 |
| 2015/0275521 A1* | 10/2015 | Bader | B32B 11/10 427/256 |
| 2017/0015083 A1* | 1/2017 | Tang | B32B 25/04 |
| 2017/0058528 A1* | 3/2017 | Verhoff | E04D 1/28 |
| 2017/0297318 A1* | 10/2017 | Keiser | B32B 27/10 |
| 2018/0282997 A1* | 10/2018 | Chen | B32B 27/16 |
| 2019/0030875 A1* | 1/2019 | Verdebout | E04D 5/10 |
| 2020/0048507 A1* | 2/2020 | Hyder | C09J 7/387 |
| 2021/0164220 A1* | 6/2021 | Cai | C09J 7/387 |
| 2022/0325526 A1* | 10/2022 | Geyer | B32B 9/043 |
| 2023/0234336 A1* | 7/2023 | Zhao | B32B 7/12 428/189 |

FOREIGN PATENT DOCUMENTS

| | | | | |
|---|---|---|---|---|
| CN | 102433007 A | * | 5/2012 | |
| CN | 102604553 A | * | 7/2012 | |
| CN | 102977621 A | * | 3/2013 | |
| CN | 203527998 U | * | 4/2014 | |
| CN | 104059553 A | * | 9/2014 | |
| CN | 104530727 A | * | 4/2015 | |
| CN | 104910639 A | * | 9/2015 | |
| CN | 105062416 A | * | 11/2015 | |
| CN | 105086895 A | * | 11/2015 | |
| CN | 105415790 A | * | 3/2016 | B32B 11/046 |
| CN | 105415791 A | * | 3/2016 | B32B 11/04 |
| CN | 205272735 U | * | 6/2016 | |
| CN | 105733280 A | * | 7/2016 | C08L 95/00 |
| CN | 105904816 A | * | 8/2016 | |
| CN | 106183268 A | * | 12/2016 | B32B 27/06 |
| CN | 106273884 A | * | 1/2017 | |
| CN | 106336674 A | * | 1/2017 | C08L 95/00 |
| CN | 107446366 A | * | 12/2017 | |
| CN | 107654025 A | * | 2/2018 | |
| CN | 108394158 A | * | 8/2018 | |
| CN | 108690539 A | * | 10/2018 | |
| CN | 109370489 A | * | 2/2019 | C09J 11/04 |
| CN | 109694691 A | * | 4/2019 | |
| CN | 110315810 A | * | 10/2019 | B32B 11/046 |
| CN | 110408341 A | * | 11/2019 | C09J 11/04 |
| CN | 110437754 A | * | 11/2019 | C08L 23/0815 |
| CN | 209599989 U | * | 11/2019 | |
| CN | 209599990 U | * | 11/2019 | |
| CN | 209718828 U | * | 12/2019 | |
| CN | 110776841 A | * | 2/2020 | |
| CN | 110862777 A | * | 3/2020 | C08K 13/06 |
| DE | 2555445 A1 | * | 6/1977 | B32B 11/04 |
| DE | 4413754 A1 | * | 10/1994 | B32B 11/02 |
| DE | 29613310 U1 | * | 12/1997 | B32B 11/04 |
| DE | 29722893 U1 | * | 4/1998 | D06N 5/00 |
| DE | 19909483 A1 | * | 4/2000 | E04D 5/12 |
| DE | 20207877 U1 | * | 9/2002 | B32B 27/32 |
| DE | 202015004236 U1 | * | 8/2015 | E04D 5/02 |
| EP | 178353 A1 | * | 4/1986 | E04D 11/02 |
| EP | 313735 A2 | * | 5/1989 | D06N 5/00 |
| EP | 317337 A2 | * | 5/1989 | B32B 27/08 |
| EP | 269989 B1 | * | 3/1991 | D06N 5/00 |
| EP | 422932 A2 | * | 4/1991 | C09J 195/00 |
| EP | 447876 A2 | * | 9/1991 | B32B 11/04 |
| EP | 450143 A2 | * | 10/1991 | E04D 1/22 |
| EP | 1741551 A1 | * | 1/2007 | B32B 11/10 |
| EP | 1941994 A1 | * | 7/2008 | B32B 11/10 |
| EP | 2674292 A1 | * | 12/2013 | B32B 11/10 |
| EP | 3235637 A1 | * | 10/2017 | B32B 25/08 |
| GB | 2165564 A | * | 4/1966 | E04D 11/02 |
| GB | 2099474 A | * | 12/1982 | E04D 5/10 |
| GB | 2212417 A | * | 7/1989 | B32B 27/08 |
| JP | 49095427 A | * | 9/1974 | |
| JP | 2007262374 A | * | 10/2007 | |
| KR | 2007041281 A | * | 4/2007 | |
| KR | 2009095993 A | * | 9/2009 | E04B 1/644 |
| KR | 969299 B1 | * | 7/2010 | B32B 11/046 |
| KR | 101117183 B1 | * | 3/2012 | B32B 11/046 |
| KR | 1352857 B1 | * | 1/2014 | |
| KR | 1473155 B1 | * | 12/2014 | |
| KR | 1508990 B1 | * | 4/2015 | B32B 11/046 |
| KR | 1611185 B1 | * | 4/2016 | B32B 15/08 |
| KR | 1681531 B1 | * | 12/2016 | B32B 11/046 |
| KR | 1911364 B1 | * | 10/2018 | B32B 11/044 |
| KR | 2019043897 A | * | 4/2019 | B32B 11/046 |
| KR | 2019100625 A | * | 8/2019 | B32B 15/08 |
| KR | 2063653 B1 | * | 1/2020 | C09D 1/00 |
| NL | 8003301 A | * | 12/1980 | B32B 11/04 |
| RU | 199229 U1 | * | 8/2020 | |
| WO | WO-9805495 A1 | * | 2/1998 | B32B 11/04 |
| WO | WO-0222985 A1 | * | 3/2002 | A47G 27/0468 |
| WO | WO-2004015216 A1 | * | 2/2004 | D06N 5/006 |
| WO | WO-2005028769 A1 | * | 3/2005 | B32B 27/08 |
| WO | WO-2006111288 A1 | * | 10/2006 | B32B 27/065 |
| WO | WO-2007021653 A1 | * | 2/2007 | B32B 27/12 |
| WO | WO-2010048198 A1 | * | 4/2010 | B32B 27/08 |
| WO | WO-2012104427 A1 | * | 8/2012 | E01C 11/005 |
| WO | WO-2015143909 A1 | * | 10/2015 | C09J 153/02 |
| WO | WO-2017049773 A1 | * | 3/2017 | B32B 27/06 |
| WO | WO-2019077107 A1 | * | 4/2019 | B32B 27/08 |

OTHER PUBLICATIONS

Machine Translation of DE-29722893-U1, Apr. 1998 (Year: 1998).*
Machine Translation of CN-209599990-U, Nov. 2019 (Year: 2019).*
Machine Translation of KR-101117183-B1, Mar. 2012 (Year: 2012).*
Machine Translation of CN-104910639-A, Sep. 2015 (Year: 2015).*
Machine Translation of CN-106183268-A, Dec. 2016 (Year: 2016).*
Kong et al., The influence of silanes on hydration and strength development of cementitious systems, Jan. 2015, Cement and Concrete Research, vol. 67, pp. 168-178 (Year: 2015).*
Momentive et al., Silquest* and Other Momentive Silanes: A Selection and Handling Guide, 2015 (Year: 2015).*

* cited by examiner

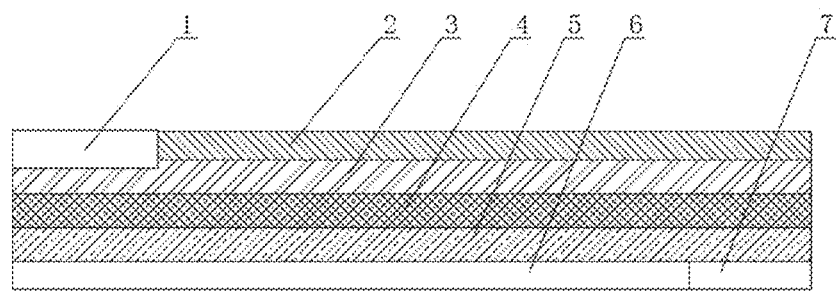

SELF-ADHESIVE WATERPROOF COILED MATERIAL OF SUPER-STRONG CROSS LAMINATED FILM AND PREPARATION PROCESS

TECHNICAL FIELD

The invention relates to the field of waterproof materials, especially a super-strong self-adhesive waterproof sheet material of a strong cross laminated film and a preparation process.

BACKGROUND

The strong cross laminated self-adhesive waterproof sheet is a high-performance cold-applied inlay-less waterproof sheet, the base material of which includes hot melt adhesive, thermoplastic elastomer, high-quality asphalt, tackifier and anti-aging agent. During the construction process, the waterproof sheet is directly applied on the base layer after removed the isolation film. After applying the waterproof sheet, the rebars are bound and concrete is casted on the upper surface (sand surface) of sheet, realizing the waterproof function. Most of the strong cross laminated film self-adhesive waterproof sheet in the prior art use a strong cross laminated film coated with asphalt-based self-adhesive adhesive on one or both sides. The above waterproof sheets can realize good waterproof effect, but there are two deficiencies in the practical application. Firstly, the existing waterproof material uses an applying method of external-proofing and external-bonding, in which the sheet is bonded to the cushion, commonly known as "raincoat type" waterproofing. When the waterproof layer is damaged, since the sheet is separated from the main structure, there is a water migration layer, and leakage and water migration occur, it is difficult to find the leakage point, which brings difficulties to the later maintenance. Secondly, the S-CLF I generation uses modified asphalt bonded with post-cast concrete through sand. Since the thickness of sheet is only 1.5 mm, the asphalt adhesive is relatively thin which exists above the strong cross laminated film in the middle of the sheet, and has small bonding strength with post-cast concrete than the hot melt adhesive of the same thickness. When the base layer has severely subsidence or the main structure has severely deformation, the asphalt adhesive might be stripped from the main structure thus reducing the waterproof effect, resulting in a potential leaking trouble. Based on the above waterproof structure, in-depth development is conducted in the present application, and by fully utilizing the characteristic that modified sand and hot melt adhesive has large bonding strength with the building main structure of post-cast concrete, a self-adhesive waterproof sheet of a strong cross laminated film is prepared with better waterproof effect.

Patent document CN210362755U discloses a novel waterproof sheet with water migration prevention function, which is characterized by: including a sand grain layer, a hot melt adhesive layer, a water-repellent non-woven fabric layer, a ternary ethylene propylene rubber or polyvinyl chloride or vinyl acetate or polyethylene or high-density polyethylene or polyolefin thermoplastic elastomer layer, in which the sand grain layer, the hot melt adhesive layer, the water-repellent non-woven fabric layer, the ternary ethylene propylene rubber or polyvinyl chloride or vinyl acetate or polyethylene or high-density polyethylene or polyolefin thermoplastic elastomer layer are arranged by stacking in sequence from top to bottom. The water-repellent non-woven fabric layer has insufficient ductility in this patent document, and there is a risk of breaking along with the deformation or subsidence of the building main structure, which will cause the waterproof sheet losing the waterproof effect.

Patent document CN105415790A discloses a fast-reacting adhesion strong cross film self-adhesive waterproof sheet, which is characterized in that: the waterproof sheet includes an upper covering layer, a reactive wet-applied self-adhesive adhesive layer and a lower covering layer in sequence from top to bottom, in which the peripheral edge of the upper covering layer is provided with an overlap edge, namely, an edge film; the upper covering layer is a strong cross laminated polyethylene film, and the strong cross laminated polyethylene film is formed by combining and hot-pressing two high-density polyethylene film crosswise at 45°; the overlap edge is a silicon-coated isolation film, the lower covering layer also uses a silicon-coated isolation film, and the silicon-coated isolation film is a polyethylene terephthalate silicon-coated isolation film. The edge films of the upper and lower adhesive material of the middle cross laminated film of the sheet in this patent are both an isolation film, which is used as a wet-applied sheet. During the construction, the sheet is bonded to the cushion layer, and meanwhile, after the isolation film on the upper surface of the sheet is removed, the constructors' feet can be stuck when walking on the sheet, and the construction convenience is poor.

SUMMARY

In order to solve the problems in the prior art, the present application provides a super-strong self-adhesive waterproof sheet material of a strong cross laminated film and a preparation process, the waterproof sheet provided in the present application has a better bonding performance with post-cast concrete than the asphalt-based material, and can better bond with the main structure (i.e. the pre-applied invert-bonding sheet). The strong cross laminated film in the middle of sheet has good ductility, and can maintain the good bonding with the main structure instead of stripping even if the base layer has slight subsidence or the main structure has slight deformation, and will still have a good waterproof effect.

A technical solution of the present application for achieving the object is as follows:

a super-strong self-adhesive waterproof sheet of a strong cross laminated film includes an isolation protection layer, a non-asphalt-based self-adhesive layer, a strong cross laminated film, an asphalt self-adhesive layer and a PE isolation film sequentially from top to bottom, in which one side of sheet material is provided with an overlap edge, and the other side of sheet is also provided with an overlap edge on the lower surface.

Moreover, the strong cross laminated film is formed by stacking, combining and hot-pressing four high-density polyethylene films crosswise one by one at 90°, and a total thickness of the four films is 0.265±0.05 mm.

Moreover, a formula and a preparation method of the asphalt-based self-adhesive layer are as follows:

| Component | Weight Ratio |
| --- | --- |
| asphalt | 42-48 |
| softening oil | 8-15 |
| SBS | 6-10 |
| SBR | 2-5 |
| tackifier | 2-4 |

-continued

| Component | Weight Ratio |
|---|---|
| talc | 28-34 |
| ultraviolet absorber | 0.1-0.4 |
| interface agent | 0.2-0.5. |

Moreover, the non-asphalt-based self-adhesive layer is a hot melt adhesive.

Moreover, a formula of the hot-melt adhesive is as follows:

| Component | Total Part |
|---|---|
| SIS | 10-15 |
| SEBS | 22-25 |
| naphthenic oil | 15-20 |
| C5 hydrogenated resin | 35-45 |
| coupling agent | 0.2-0.6 |
| anti-aging agent | 0.1-0.3. |

Moreover, the isolation protection layer is sand, including 30-45% sand with a particle size of 30-40 mesh, 30-50% sand with a particle size of 40-60 mesh and a remainder of 60-70 mesh.

Moreover, a preparation method of the sand includes that: taking 60-70 parts of white cement, 10-20 parts of white cement raw meal, 1-3 parts of seed crystals and 10-20 parts of fluorite, crushing all the components and subjecting them to slurry preparation, blank preparation and sintering, in which a sintering temperature is 1200-1400° C., crushing the sintered product, and sieving the product.

Moreover, the sand is modified sand, and a modification method includes that: adding sand measured in a proportion into a high-speed mixer, preheating the sand, in which the sand is preheated to a temperature of 100-110° C., dried with the mixer's mouth opened during the mixing and preheating process and preheated for 120-125 minutes, ensuring that a moisture content of the sand is lower than 0.3%, and then, adding a coupling agent in a proportion into the mixer, in which an addition amount of the coupling agent is 4-5% of the total weight of the sand, modifying the sand for 30-35 minutes, taking the sand out and storing the sand at room temperature for later use, in which it is preferred to keep a temperature at 100-110° C. during the modifying process.

Moreover, the coupling agent is A-1100.

Moreover, a preparation process of the super-strong self-adhesive waterproof sheet material of a strong cross laminated film includes that:

(1) asphalt adhesive material molding: performing a roller press briquetting, and controlling a pouring temperature at 140±10° C.;
(2) blade coating process of the hot melt adhesive: controlling a temperature of blade coating at 145±10° C. for the hot melt adhesive self-adhesive layer;
(3) sand-spreading control of the isolation layer: spreading the sand uniformly and ensuring no adhesive material exposed; pressing the sand: starting a sand pressing device and controlling a pressure at 0.4-0.6 MPa;
(4) winding the finished product and delivering it to warehouse.

Advantages and economic effects of the present application are as follows.

1. In terms of the structure of the super-strong self-adhesive waterproof sheet of a strong cross laminated film, the unique structure thereof improves various physical properties of sheet; sheet has relatively high tensile strength and tearing strength as well as excellent ductility, giving sheet better construction applicability. The high tearing strength, high tensile strength and excellent ductility enable sheet to adapt to complex construction environments, such as the spot with large deformation of the base layer and stress concentration.
2. For the self-adhesive waterproof sheet of a strong cross laminated film provided in the present application, the strong cross laminated film with a thickness of 0.265 mm+0.05 is selected; the film has good flexibility, stands docile during construction, and can be easily applied to various spots in the construction site, such as foundation pit, pile head and internal and external corners; sheet can stay flat and straight during the construction, and realize complete "bonding between adhesive" when overlapping joint, which is simple and reliable, and the overlap edge will not curl up.
3. The modified sand on the upper surface of the waterproof sheet provided in the present application can effectively reflect the ultraviolet lights, protect sheet well from aging when the protective layer is not constructed in time, and further exert isolation effect, which is convenient for constructors to walk on sheet for working, improving the construction efficiency.
4. The self-adhesive waterproof sheet of a strong cross laminated film provided in the present application has a thickness of 1.5 mm, and additionally has a model with a maximum thickness of 2 mm. Compared with the traditional waterproof sheet, the sheet has reduced mass and thickness and shows more convenient for workers to operate.
5. The sand of the waterproof sheet provided in the present application uses the silane coupling agent of γ-aminopropyltriethoxysilane (APTS) for modification; the hydrolyzable groups of the agent can be subjected to condensation reaction with the hydroxyl groups on the sand surface or on the post-cast concrete, and the organic groups of the agent can form chemical bonds with the polymer in the hot melt adhesive; the agent bridges between the inorganic substance and the polymer, thereby improving the peel strength of sheet with the main structure of post-cast concrete, facilitating to a better waterproof effect of sheet.
6. The waterproof sheet provided in the present application has reliable bonding and easy maintenance. The hot melt adhesive used is a pressure-sensitive adhesive, also known as "non-drying adhesive", which has fluidity, permeability, creep and sealing properties. It can fill the micro-cracks on the surface of the concrete base layer, and has a sealing effect on the concrete base layer. Additionally, the adhesive results in a more firm bonding between sheet and the concrete, effectively controls the phenomenon of water migration, and truly realizes the goal of integrating the waterproof material and the waterproof main structure. Even if there is some local damage to sheet, the water will be confined in a small range and will not move between layers. Even if there are individual leakage points, the leakage point will be consistent with the damage point, which is very easy to find and repair.
7. A pre-applied method is used for construction, which has low requirements on the base surface and saves the construction period. Sheet uses pre-applied invert-bonding, requiring no protective layer and saving one protective layer. Additionally, sheet can be applied to the wet or even unleveled base layer, requiring no primer coating or pretreatment, which has high construction freedom, and has no limitation by the weather, greatly saving the construction period.

8. The hot melt adhesive provided in the present application has good low-temperature bonding performance, which can be applied at an ambient temperature of about −5° C., facilitating to the construction project with tight schedules in winter.

BRIEF DESCRIPTION OF DRAWINGS

FIG. 1 is a layered structure diagram of a sheet provided in the present application.

DETAILED DESCRIPTION

The present application is further described hereinafter in conjunction with specific embodiments. The raw materials and equipment used in the embodiments hereinafter are commercially available unless otherwise specified.

A super-strong self-adhesive waterproof sheet material of a strong cross laminated film included an isolation protection layer 2, a non-asphalt-based self-adhesive layer 3, a strong cross laminated film 4, an asphalt self-adhesive layer 5 and a PE isolation film 6 sequentially from top to bottom, in which overlap edges 1 and 7 were arranged on sides of sheet material, and the overlap edge is an isolation edge film of a PET material.

In the above material, the isolation protection layer was a sand layer (30-45% sand with a particle size of 30-40 mesh, 30-50% sand with a particle size of 40-60 mesh and a remainder of 60-70 mesh), the non-asphalt-based self-adhesive layer was a hot melt adhesive layer (with a thickness of 0.3-0.5 mm), the asphalt self-adhesive layer (with a thickness of 1.0-1.2 mm), and the PE isolation film was an isolation film available commercially.

The strong cross laminated film was formed by stacking, combining and hot-pressing four high-density polyethylene films crosswise one by one at 90°, and a total thickness of the four films was 0.265 mm, and for four combined cross laminated films (HDPE film), the cross arrangement of the four layers could further enhance the tensile strength and tearing strength of the cross laminated film while retaining the high elongation of the PE film. The thickness of 0.265 mm could guarantee the forming performance of sheet. With the excessively large thickness, sheet will has poor forming performance and turn to low strength. The excessively small thickness will cause overly large tensile strength, reducing the film toughness, which has an adverse impact on the ductility and waterproofness. Therefore, the cross laminated film with a thickness of 0.265 mm±0.05 was selected in the present application, which can not only ensure the film toughness, but satisfy the ductility as well.

A formula and a preparation method of the asphalt-based self-adhesive layer were as follows:

| Component | Weight Ratio | Model Number |
| --- | --- | --- |
| asphalt | 42-48 | 90#A |
| softening oil | 8-15 | KN4006 |
| SBS | 6-10 | 1401 (thermoplastic styrene-butadiene rubber) |
| SBR | 2-5 | powder |
| tackifier | 2-4 | (softening point at 90-120° C.) C5 hydrogenated resin |

-continued

| Component | Weight Ratio | Model Number |
| --- | --- | --- |
| talc | 28-34 | 380 mesh |
| ultraviolet absorber | 0.1-0.4 | UV284 |
| interface agent | 0.2-0.5 | polyvinyl acetate. |

A preparation method of the asphalt-based self-adhesive layer was as follows.

1 Proportioning the components of the asphalt self-adhesive layer 1.2 Measuring the asphalt, with an error controlled within ±20 kg;

1.3 Measuring the softening oil: with an error controlled within ±20 kg.

1.4 Heating up: when the temperature exceeded 150° C., the modifiers such as SBS could be added according to the prescribed amount in the formula, and then, the system was heated to (180±10)° C., kept at the temperature and stirred for (120±20) min.

1.5 Grinding and dispersing: a grinding gap was controlled at 2 mm, the grinding was performed twice, a total time was controlled within (50-60) min, and a temperature was kept at (180±10)° C. during the grinding;

1.6 Adding the auxiliary agents and fillers: the auxiliary agents and fillers were added into a rotary furnace according to the prescribed amount, and the system was kept at (170±10)° C. and stirred for 60 min.

In addition to using the sand commercially available in the present application, a special sand of the present application was preferred to use, because the common sand was crushed and relatively hard, and had lots of sharp edges and angles, which could easily damage sheet material, and had a strong bond with cement mortar.

A white cement was used to prepare the sand in the present application, and a preparation method of the special sand includes that: 60-70 parts of white cement, 10-20 parts of white cement raw meal, 1-3 parts of seed crystals (silicate clinker or white cement clinker was preferred to use) and 10-20 parts of fluorite (or fluorite tailing) were taken, the above components were crushed and subjected to slurry preparation, blank preparation and sintering, in which a sintering temperature was 1200-1400° C., the sintered product was crushed and sieved until 30-45% sand got a particle size of 30-40 mesh, 30-50% sand got a particle size of 40-60 mesh and a remainder got 60-70 mesh.

In the method, the white cement was a hydraulic cementitious material prepared by adding gypsum into white silicate cement clinker and grinding the same. When the cement was ground, it was allowed to add limestone with an amount less than or equal to 5% of the cement mass. The standard for silicate clinker is GB/T 21372-2008 Cement Clinker, and the standard for cement raw meal is GSB 08-1353-2017.

The special sand was modified subsequently and then applied to sheet material of the present application, and a modification method includes that: sand measured in a proportion was added into a high-speed mixer and preheated, in which the sand was preheated to a temperature of 100-110° C., an opening-drying was performed during the mixing and preheating process and the sand was preheated for 120-125 minutes, ensuring that a moisture content of the sand was lower than 0.3%, and then, a coupling agent was added in a proportion into the mixer, in which an addition amount of the coupling agent was 4-5% of the total weight of the sand, and be careful to avoid that the coupling agent struck into the stirring paddle and attached on the inner wall of the mixer, and the sand was modified for 30-35 minutes, taken out and stored at room temperature for later use, in which a temperature was preferred to kept at 100-110° C. during the modification process. The coupling agent was preferred to use the A-1100 silane coupling agent of Momentive, America. The modified sand had large bonding strength and thus had higher bonding degree with the adhesives and cement. It has been confirmed by experiments that the bonding strength of the sand is increased by more than or equal to 30%.

Under an anhydrous condition, siloxane bonds react directly with hydroxyl groups on the silica surface to achieve the modification:

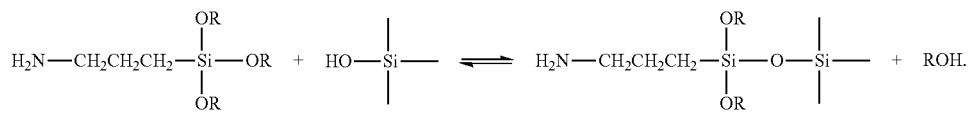

The silane coupling agent contains two different chemical functional sides, one of which (a siloxane end) can react with silanol groups on the surface of inorganic materials (such as glass with the resin; thereby, the coupling can be realized, enhancing the performance of the composite material.

A formula of the hot melt adhesive:

| No. | Name | Origin | Specification | Feeding Part |
|---|---|---|---|---|
| 1 | SIS | Baling Petrochemical | 1225 | 12.5 |
| 2 | SEBS | Baling Petrochemical | YH-501T | 26.5 |
| 3 | naphthenic oil | Karamay | KN 4006 | 19.2 |
| 4 | C5 hydrogenated resin | Lanzhou Petrochemical | S-100 | 41 |
| 5 | coupling agent | Nanjing Xiangqian Chemical Co., Ltd. | KH570 | 0.5 |
| 6 | anti-aging agent | Bayer AG (Germany) | 264 | 0.3 |

A production method of the hot melt adhesive was as follows.
1. Measuring the oil, with an error controlled within ±5 kg
2. Heating up: when the temperature exceeded 150° C., the modifiers such as SBS and SEBS could be added according to the prescribed amount in the formula, and then, the system was heated to (170±5)° C., kept at the temperature and stirred for (150±20) min.
3. Adding the resin, the coupling agent and the anti-aging agent: the system was kept at a temperature condition of (170±5)° C. and stirred for 60 min; and
4. Molding the hot melt adhesive.

The hot melt adhesive was discharged from a discharge port to a mold, cooled, coated, boxed, and delivered to warehouse.

A preparation process of the super-strong self-adhesive waterproof sheet material of a strong cross laminated film provided in the present application was as follows: in general, using a process of a hot-melt extrusion performed on the upper surface and a roller press briquetting performed on the lower surface.

(1) Asphalt adhesive material molding: a roller press briquetting was performed, and a casting temperature was controlled at (140±10)° C.

(2) Blade coating process of the hot melt adhesive: a temperature of blade coating was controlled at (145±10)° C. for the hot melt adhesive self-adhesive layer.

(3) Sand-spreading control of the isolation layer: the sand was spread uniformly and no adhesive material was exposed.

Pressing the sand: a sand pressing device was started and a pressure was controlled at 0.4-0.6 MPa.

(4) The finished product was winded and delivered to warehouse.

It has been confirmed by experiments that: for the strong cross laminated self-adhesive waterproof sheet, the peel strength between the non-asphalt-based surface and a post-cast concrete was much greater than that of the asphalt surface and the post-cast concrete, which was about 130-150% of the original.

The properties of sheet prepared in the present application are as follows:

| No. | Test Item | Index | Test Data |
|---|---|---|---|
| 1 | Tensile force/(N/50 mm)≥ | 550 | 683 |
| 2 | Film breaking elongation/%≥ | 200 | 359 |
| 3 | Nail tearing strength/N≥ | 300 | 421 |
| 4 | Heat resistance | Sliding less than or equal to 2 mm at 80° C. | No sliding |
| 5 | Low temperature flexibility | No crack appearing at −25° C. | No crack |
| 6 | Impermeability (0.3 MPa, 120 min) | Impermeable | Impermeable |
| 7 | Peel Sheet No treatment≥ | 1.0 | 1.8 |

-continued

| No. | Test Item | | Index | Test Data |
|---|---|---|---|---|
| | strength/(N/mm)$^a$ and sheet | Heat treatment≥ | 1.0 | 1.7 |
| | | Water immersion treatment≥ | 1.0 | 1.9 |
| 9 | Oil permeability/number of sheets≤ | | 2 | 1 |
| 11 | Resistance to impact | | Diameter (10 ± 0.1) mm, no leakage | No leakage |
| 12 | Resistance to static loading | | 20 kg, no leakage | No leakage |
| 13 | Water migration resistance (hydraulic gradient) | | 0.8 MPa/35 mm, no water migration within 4 h | No water migration |
| 14 | Peel strength with post-cast concrete (N/mm) | No treatment≥ | 2.0 | 3.3 |
| | | Water immersion treatment≥ | 1.5 | 3.4 |
| | | Silt pollution≥ | 1.5 | 3.2 |
| | | Ultraviolet treatment≥ | 1.5 | 3.4 |
| | | Heat treatment≥ | 1.5 | 3.3 |
| 15 | Peel strength with post-cast concrete after water immersion (N/mm)≥ | | 1.5 | 3.1 |
| 18 | Heat aging (80° C., 168 h) | Tensile retention rate/%≥ | 90 | 96 |
| | | Elongation retention rate/%≥ | 80 | 91 |
| | | Low temperature flexibility | −23° C., no crack | No crack |
| 19 | Dimensional change rate/% | | ±1.0 | 0.3 |

What is claimed is:

1. A super-strong self-adhesive waterproof sheet material of a strong cross laminated film, comprising an isolation protection layer, a non-asphalt-based self-adhesive layer, a strong cross laminated film, an asphalt self-adhesive layer and a PE isolation film sequentially from top to bottom, wherein one side of sheet is provided with an overlap edge, and the other side of sheet is also provided with an overlap edge on the lower surface, wherein the isolation protection layer is sand modified by γ-aminopropyltriethoxysilane, comprising 30-45% sand with a particle size of 30-40 mesh, 30-50% sand with a particle size of 40-60 mesh and a remainder of 60-70 mesh;

the non-asphalt-based self-adhesive layer is a hot melt adhesive, and a formula of the hot melt adhesive is as follows:

| Component | Total Part |
|---|---|
| SIS | 10-15 |
| SEBS | 22-25 |
| naphthenic oil | 15-20 |
| C5 hydrogenated resin | 35-45 |
| coupling agent | 0.2-0.6 |
| anti-aging agent | 0.1-0.3. |

2. The super-strong self-adhesive waterproof sheet material of the strong cross laminated film according to claim 1, wherein the strong cross laminated film is formed by stacking, combining and hot-pressing four high-density polyethylene films crosswise one by one at 90°, and a total thickness of the four films is 0.265±0.05 mm.

3. The super-strong self-adhesive waterproof sheet material of the strong cross laminated film according to claim 1, wherein a formula and a preparation method of the asphalt-based self-adhesive layer is as follows:

| Component | Weight Ratio |
|---|---|
| asphalt | 42-48 |
| softening oil | 8-15 |

-continued

| Component | Weight Ratio |
|---|---|
| SBS | 6-10 |
| SBR | 2-5 |
| tackifier | 2-4 |
| talc | 28-34 |
| ultraviolet absorber | 0.1-0.4 |
| interface agent | 0.2-0.5. |

4. The super-strong self-adhesive waterproof sheet material of the strong cross laminated film according to claim 1, wherein a preparation method of the sand comprises: providing components comprising 60-70 parts of white cement, 10-20 parts of white cement raw meal, 1-3 parts of seed crystals and 10-20 parts of fluorite, crushing all of the components and subjecting them to slurry preparation, blank preparation and sintering, wherein a sintering temperature is 1200-1400° C., crushing the sintered product, and sieving the product;

a modification method for the sand comprises: adding the sand measured in a proportion into a high-speed mixer, preheating the sand, wherein the sand is preheated to a temperature of 100-110° C., dried with the mixer being opened during the mixing and preheating process and preheated for 120-125 minutes ensuring that a moisture content of the sand is lower than 0.3%, and then adding a coupling agent in a proportion into the mixer, wherein an addition amount of the coupling agent is 4-5% of the total weight of the sand, modifying the sand for 30-35 minutes, keeping a temperature at 100-110° C. during the modifying process, removing the sand from the mixer after modification and storing the sand at room temperature.

5. The super-strong self-adhesive waterproof sheet material of the strong cross laminated film according to claim 4, wherein the coupling agent is the γ-aminopropyltriethoxysilane.

6. The super-strong self-adhesive waterproof sheet material of the strong cross laminated film according to claim 1, wherein a preparation process of the super-strong self-adhesive waterproof sheet material of the strong cross laminated film comprises:
- (1) an asphalt adhesive material molding process: performing a roller press briquetting, and controlling a temperature of the adhesive material at 140±10° C.;
- (2) a blade coating process of the hot melt adhesive: controlling a temperature of blade coating at 145±10° C. for the hot melt self-adhesive layer;
- (3) a sand-spreading control process of the isolation layer: spreading the sand uniformly and ensure no adhesive material is exposed, and then pressing the sand by starting a sand pressing device and controlling a pressure at 0.4-0.6 MPa;
- (4) winding the finished product and delivering it to a warehouse.

* * * * *